United States Patent [19]

Schaefer

[11] 4,428,653

[45] Jan. 31, 1984

[54] MIRROR REFLEX CAMERA WITH AN ELECTRONIC RANGE FINDER

[75] Inventor: Klaus-Dieter Schaefer, Braunfels, Fed. Rep. of Germany

[73] Assignee: Ernst Leitz Wetzlar GmbH, Wetzlar, Fed. Rep. of Germany

[21] Appl. No.: 358,194

[22] Filed: Mar. 15, 1982

[30] Foreign Application Priority Data

Apr. 3, 1981 [DE] Fed. Rep. of Germany ....... 3113507

[51] Int. Cl.³ .............................................. G03B 3/00
[52] U.S. Cl. ................................................... 354/403
[58] Field of Search ............................................ 354/25

[56] References Cited

U.S. PATENT DOCUMENTS 4,185,191  1/1980  Stauffer .............................. 250/204
4,188,102  2/1980  Schaefer ............................... 354/25
4,200,786  4/1980  Holle ................................ 354/25 X Primary Examiner—Michael L. Gellner Attorney, Agent, or Firm—Wells & Wells

[57] ABSTRACT

In a mirror reflex camera (1) having a viewer system consisting of a focusing screen (4), a field lens (5) a pentaprism (7) and an ocular (6) and with an electronic range finder (9, 10a10n), an optical means (11) defining a measuring spot is arranged in the plane of the focusing screen for the purpose of splitting the exit pupil (AP) of the picture-taking objective (2). This optical means is a clear-glass wedge and splits a partial beam (12) off the viewer beam (8). This partial beam serves to generate, upon its reflection from the surfaces 7b and 7a of the pentaprism (7) and from the concave mirror 7d ground on the lower edge of the exit side 7c, an image (B") of the object onto the lens elements 10a–10n of the array (9) of photoelectric detectors. The outer bounding 30 of the concave mirror 7d is selected to be rectangular or square and the radii of the lens elements (10a–10n) are such that only one particular pair of detectors of the array (9) of photoelectric detectors is impinged by light from the lens elements 10a–10n.

6 Claims, 4 Drawing Figures

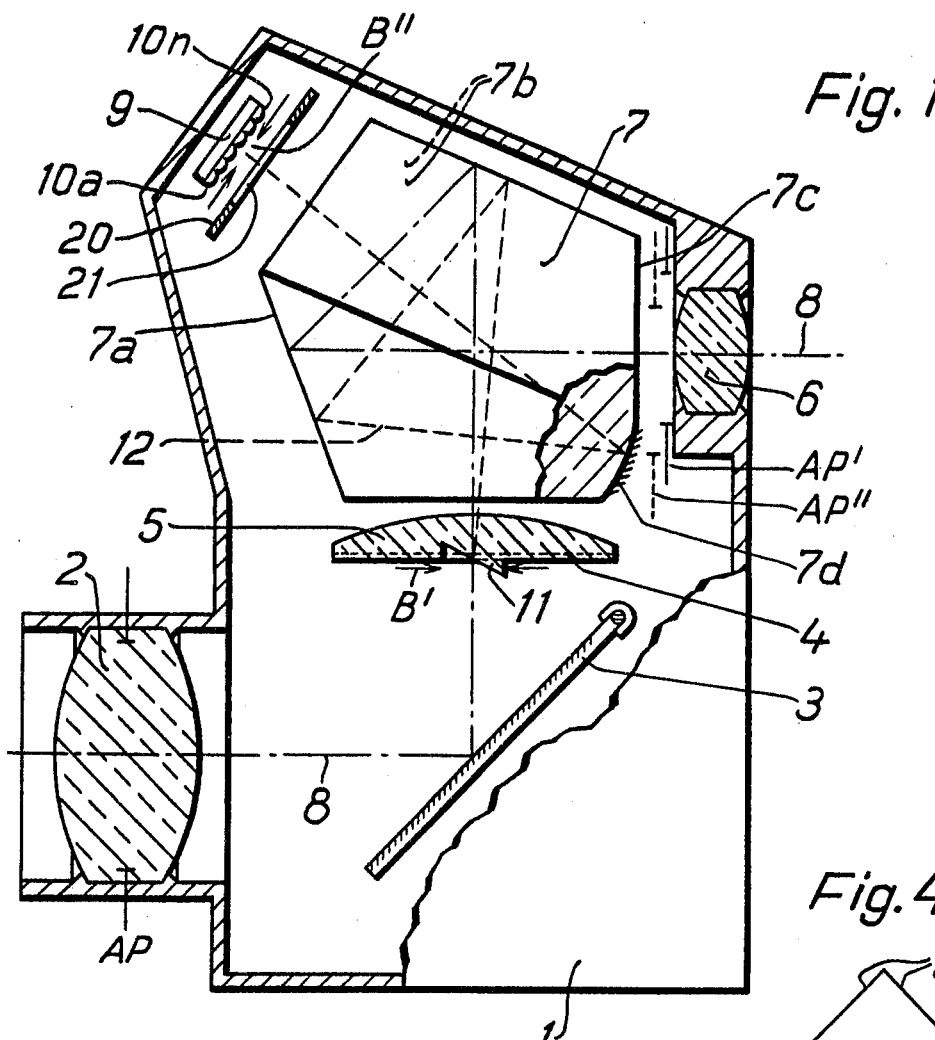
Fig. 1
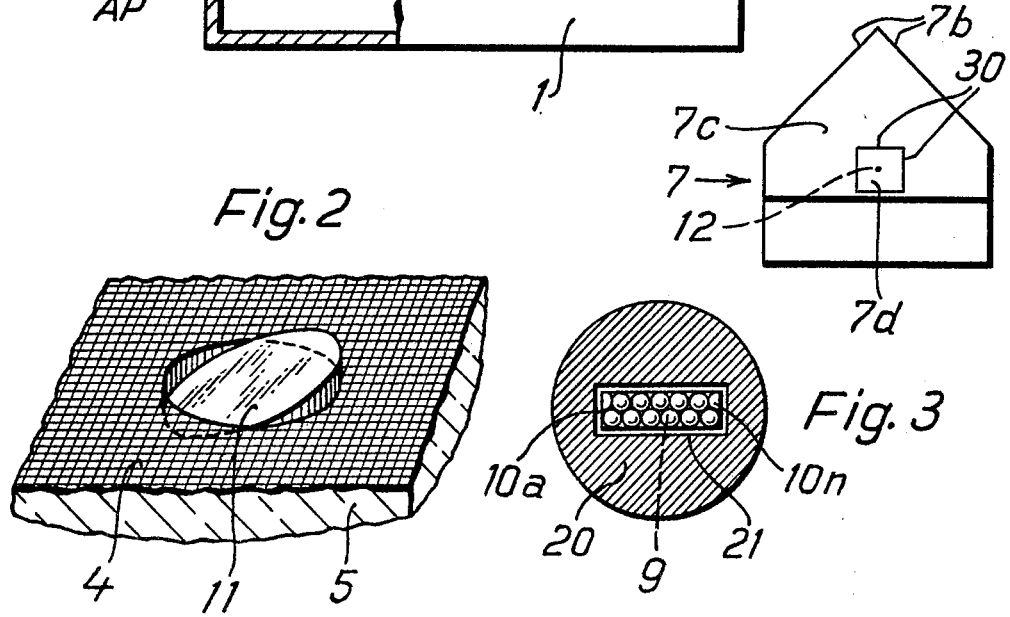
Fig. 2
Fig. 3
Fig. 4

MIRROR REFLEX CAMERA WITH AN ELECTRONIC RANGE FINDER

CROSS-REFERENCE TO RELATED APPLICATIONS

Applicant claims priority under 35 USC 119 for application P31 13 507.2 filed Apr. 3, 1981 in the Patent Office of the Federal Republic of Germany.

The disclosure of applicant's copending application Ser. No. 320,075 filed Nov. 10, 1981 is incorporated herein to show the optical wedge defining a measuring spot as used in the present invention and the mask in front of the array 9.

BACKGROUND OF THE INVENTION

The field of the invention is photography with range finder and view finder. The invention is particularly concerned with a mirror reflex or single lens reflex (SLR) camera having a view finder consisting of a focusing screen, a field lens, a pentaprism and an ocular and comprising an electronic rangefinder. In this camera an image of the object to be photographed taken by the objective is projected by a fully specular concave mirror ground on the lower edge of the pentaprism exit face through the pentaprism of the mirror reflex camera.

The state of the art of the present invention may be ascertained by reference to U.S. Pat. Nos. 4,185,191 and 4,188,102 the disclosures of which are incorporated herein.

U.S. Pat. No. 4,188,102 discloses a range finder wherein a concave mirror is ground on the lower edge of the pentaprism exit face and wherein the prism angles are selected so that the view finder axis is directed at an angle downward from the optical axis which in the ordinary use of the camera would be horizontal. Moreover, with respect to its horizontal optical axis, in the ordinary use the ocular is upwardly offset and sloped so that an angle is subtended between the ocular and view finder axis.

Due to the tilt of the optical axis for the viewer optics on the one hand and the measuring beam on the other one, it is possible that the changes in angle required in the pentaprism result in undesired reflections in the viewer image. Furthermore, the mutual tilting of these two optical axes results in a bothersome darkening of the viewer image when low-light, long-focal length objectives are used. The exit pupil in these cameras is well known to be smaller than the ocular window.

U.S. Pat. No. 4,185,191 discloses particularly in FIGS. 10,11 and 14 an electrical range finder wherein an image of the object to be photographed is projected onto the image plane of the picture-taking objective or onto a single plane conjugate to it, wherein on an array of photoelectric detectors is mounted. The detectors are preceded by a plurality of lens elements so arranged that two adjoining detector elements each receive the light from one half-pupil of the picture-taking objective only. It is difficult to make such a device because the size of the pupil images varies with the relative aperture of the objective. Therefore, a delicate adjustment is required especially when objectives with small relative apertures are used, because the light beams from the two objective halves become different even by small lateral offsets. With small stops this system therefore becomes unusable. On the contrary using large relative apertures light beams from given pupil halves may reach neighboring detector elements, which again would be source of error.

SUMMARY OF THE INVENTION

Having in mind the limitations of the prior art, it is an object of the present invention to remedy the above described limitations in an electronic range finder having two tightly adjoining arrays of photoelectric detectors of different sizes where the lens elements preceding the detectors are dimensioned so that one array is impinged with light from large relative apertures and the other array is impinged with light from small relative apertures. Using two such arrays of detectors means, however, higher cost in components regarding the detecting components proper and furthermore, there is a need for additional switching means that must be actuated by suitable setting means at the objectives, whereby the camera and the objectives are rendered more complicated and more costly. It is furthermore known in the art to arrange dark partition means between the individual lens elements preceding the detector arrays so as to prevent "cross-talk" between neighboring detector elements. Such a step, however, fails to reduce the above cited adjustment delicacy at small relative apertures, moreover there is an undesired cutting off of obliquely incident light beams as an additional error. Besides, the arrangement of such partition means is difficult to implement.

It is also an object of the present invention to prevent these additional drawbacks in a mirror reflex camera with an electronic range finder by an intermediate imaging of the objective pupil so as to achieve a pupil image localization which is so defined that beam-limiting means will not be necessary in the vicinity of the arrays of photoelectric detectors, and in particular not in the plane of the lens elements preceding these arrays.

As regards a mirror reflex camera having a view finder consisting of a focusing screen, a field lens, a pentaprism, an ocular and an electronic range finder where an image of the object is projected by a fully specular concave mirror ground on the lower edge of the pentaprism the object of the present invention is achieved by providing an optical means defining a measuring spot and located in the plane of the focusing screen of the viewer means, this optical means deflects part of the viewer beam so that two vertically mutually offset and partly overlapping pupil images are generated in the vicinity of the concave mirror and the ocular as well, one of which is central with respect to the ocular optics and generates the light of the object environment, whereas the other is generated by the light from the measuring spot and is projected directly from the concave mirror to the electronic range finder.

BRIEF DESCRIPTION OF THE DRAWING

The drawings show the invention in schematic manner in relation to an embodiment which is described in further detail below.

FIG. 1 is a side view of a schematic partial cross section showing a mirror reflex camera with the optical means designed and arranged in conformity with the invention to specifically bound the image of the objective pupil;

FIG. 2 is a detailed showing of the wedge 11 of FIG. 1;

FIG. 3 is a detailed showing of mask 20 of FIG. 1; and

FIG. 4 is a detailed showing of the outer boundary 30 of FIG. 1.

DESCRIPTION OF THE PREFERRED EMBODIMENT

With particular reference to FIG. 1, there is shown a housing 1 of the mirror reflex camera comprising an objective 2 and a reflex mirror 3. A field lens 5 integral in this instance with a focusing screen 4 is located above the reflex mirror 3. The image B' of an object is generated by means of the objective 2 on the focusing screen 4. This image B' is observed by the camera user through an ocular 6 acting as a magnifier and through a pentaprism 7. The pentaprism dimensions are selected so that the optical axis 8 of the objective 2 upon being twice reflected at the reflection surfaces 7a and 7b in the pentaprism 7 leaves the camera housing 1 at its rear parallel to its path in the objective 2. The ocular 6 is arranged so that its optical axis coincides with that of the objective 2. That part of the light beam which passes through the pentaprism 7 between the objective 2 and the ocular 6 is designated as the viewer beam. Its center ray is designated by reference 8 and is shown by dot-dash lines.

The camera shown moreover is equipped with an electronic range finder. This range finder consists of an array 9 of photoelectric detectors preceded by lens elements 10a–10n. The operation of such an array of detectors is without significance of the present invention and is described in detail in U.S. Pat. No. 4,185,191, particularly in FIGS. 10, 11 and 14. In view of that description, it is necessary that the image B' of the object be projected onto the array 9 of the photoelectric detectors. As simultaneously (and already described above) the image must also be seen in ocular 6, it is necessary to split the beam of the image B'. In the present invention this is accomplished by splitting the beam geometrically, that is, by splitting the exit pupil of the objective 2.

For that purpose a clear-glass wedge 11 defining a measuring spot is arranged in the plane of the focusing screen 4 and at its center this wedge 11, which is disclosed in detail in application Ser. No. 320,075, generates an image AP" which is vertically offset from the image AP' of the exit pupil AP of the objective. This image AP' is projected by the field lens 5 into the ocular plane and is central in that ocular 6. This means that a partial beam 12 shown in dashed lines is split off the view beam 8. Thus the field lens 5, following the reflection of this partial beam 12 at the surfaces 7b and 7a of the pentaprism 7 and furthermore at a concave mirror 7d ground at a lower edge of the prism exit side 7c, generates an image of the object on the lens elements 10a–10n preceding the array 9 of photoelectric detectors. The wedge-angle of the clear-glass wedge 11, as in application Ser. No. 320,075, is chosen so that the optical axis of the partial beam 12 is directed at the center of the concave mirror 7d, whereby this mirror is fully illuminated.

Because the concave mirror 7d reflects not only the light beam from the partial pupil AP" belonging to the measuring spot and split off by the wedge-angle of the clear-glass wedge 11, but also at the same time reflects a light beam from the object's surroundings which is undesired per se for range-finding in the direction of the array 9 of photoelectric detectors, the latter undesired light beam must be stopped by a mask, in front of the array 9 of photoelectric detectors as shown in FIG. 3. Mask 20 has an aperture 21 through which array 9 is seen.

The advantage of the present invention when used in a mirror reflex camera is that the sizing of the lens elements in front of the array of photoelectric detectors now is independent of the initial aperture and of the pupil position of the particular objective being used. By selecting a rectangular or a square outer boundary 30 for the concave mirror 7d as shown in FIG. 4 and a corresponding adaptation of the radii of the lens elements 10a–10n, it is now possible that the individual pairs of the array are exposed only individually to the light from the image B', whereby "cross-talk" of information contained in the light with neighboring detector elements can now be prevented without resorting to partition means or other mechanical limiting means.

I claim:

1. A mirror reflex camera comprising:
    (a) a picture taking objective having a horizontal optical axis and an object image projected by said picture taking objective;
    (b) an electronic range finder comprising a plurality of lens elements (10a–10n) mounted in front of an array of photoelectric detectors (9);
    (c) a viewer system located along said optical axis comprising in series a focusing screen having a plane, a field lens, a pentaprism and an eyepiece, said optical axis being offset in parallel from its original path by two reflections in said pentaprism and exiting said eyepiece;
    (d) mirror means comprising a fully specular concave mirror (7d) provided at the lower edge of the exit surface of said pentaprism (7) and having a focal plane;
    (e) means (11) defining a measuring spot in said plane for optically deflecting a first portion (12) and a second portion (8) of said object image; in the vicinity of said eyepiece (6) and in the vicinity of said concave mirror (7d), first and second mutually vertically offset and over-lapping pupil images (AP',AP") are generated by said first and second portions, said first pupil image (AP') being central with respect to said eyepiece (6) and generated by said second portion, while said second pupil image (AP") is generated by said first portion; and
    (f) said mirror means projecting said second pupil image (AP") onto said plurality of lens elements located in said focal plane of said mirror means.

2. The mirror reflex camera of claim 1, wherein said lens elements (10a–10n) mounted in front of said array (9) of detectors have given radii, for imaging said concave mirror (7d) precisely on a single pair of detectors of said photoelectric detector array (9).

3. The mirror reflex camera of claim 1, wherein said means defining a measuring spot is a clear glass wedge (11).

4. The mirror reflex camera of claim 4, wherein said wedge has an angle sufficient to direct said first portion and said pupil image (AP") incident on said concave mirror (7d) at the center of said concave mirror (7d), whereas said second portion and said pupil image (AP') essentially is incident on said ocular (6).

5. The mirror reflex camera of claim 1, having an outer boundary (30) of said concave mirror (7d) which is rectangular.

6. The mirror reflex camera of claim 5, wherein said outer boundary is square.

* * * * *